United States Patent
Cowles

Patent Number: 5,242,358
Date of Patent: Sep. 7, 1993

[54] MACHINE TOOL ACCESSORY MOUNTING METHOD AND APPARATUS

[75] Inventor: Dennis Cowles, Broadview Heights, Ohio

[73] Assignee: Joy Technologies Inc., Pittsburgh, Pa.

[21] Appl. No.: 804,853

[22] Filed: Dec. 6, 1991

[51] Int. Cl.⁵ .............................................. B23Q 3/157
[52] U.S. Cl. ........................................ 483/1; 409/144; 409/230; 483/3; 483/32; 483/55
[58] Field of Search ............................ 483/1, 3, 32, 55; 409/144, 215, 230, 233; 29/50; 279/2.23

[56] References Cited

U.S. PATENT DOCUMENTS

| | | | |
|---|---|---|---|
| 3,748,965 | 7/1973 | Galbarini et al. | 409/215 |
| 3,930,301 | 1/1976 | Wagner | 483/32 |
| 4,012,818 | 3/1977 | Dornbluth et al. | 483/32 |
| 4,350,463 | 9/1982 | Friedline | 279/2.23 X |
| 4,427,325 | 1/1984 | Kielma et al. | 409/144 |
| 4,614,470 | 9/1986 | Mitsuharu et al. | 409/230 |

FOREIGN PATENT DOCUMENTS

| | | | |
|---|---|---|---|
| 0090215 | 7/1980 | Japan | 409/144 |
| 0927416 | 5/1982 | U.S.S.R. | 409/230 |

OTHER PUBLICATIONS

Brochure of Ball Lock Mounting Systems printed by Jergens, Inc. of Cleveland, Ohio. Printed 1991.

Two pages of Jergens, Inc. Industrial Supply catalog describing pre-fill boosters. Printed. 1990.

Primary Examiner—Z. R. Bilinsky
Attorney, Agent, or Firm—Kirkpatrick & Lockhart

[57] ABSTRACT

An apparatus for operatively coupling a rotatably driven machine tool accessory, such as a right angle milling head, to a machine tool having a rotary output shaft, such as a horizontal boring machine. The apparatus includes a first collar that is mounted to the horizontal boring machine in a position that is adjacent to the rotary output shaft thereof. A second collar is mounted to the machine tool accessory and is adapted to mate with the first collar. Cylinder actuated ball locking devices are provided in the second collar and are adapted to be received in corresponding receptacles in the first collar. The cylinders are adapted to cause the ball locking devices to engage the receptacles in the first collar to thereby secure the first collar to the second collar. To disengage the second collar from the first collar, the cylinders are retracted to permit the ball lock devices to disengage the receptacles in the first collar. A drive member, adapted to be received in a spindle member mounted to the output shaft of the horizontal boring machine, is provided to positively engage the rotary driven element of the machine tool accessory. A cradle is provided to support the machine tool accessory in a known position remote from the spindle on the horizontal boring machine. A cylinder actuated enclosure is pivotally fastened to the cradle to protect the machine tool accessory when not in use.

13 Claims, 9 Drawing Sheets

MACHINE TOOL ACCESSORY MOUNTING METHOD AND APPARATUS

BACKGROUND OF THE INVENTION

1. Field of the Invention

The present invention relates to a method and apparatus for mounting an accessory on a machine tool and, in particular, to a method and apparatus for automatically mounting a right angle milling head to a horizontal boring machine.

2. Description of the Invention Background

For decades, all large metal machining operations have employed the services of horizontal boring machines. Such apparatuses are aptly named because they provide a horizontal shaft on which either milling, facing, drilling or other tools may be received. The horizontal shaft is typically mounted within a vertically displaceable housing while the workpiece is mounted on a table or carriage which may be moved along both horizontal axes relative to the housing. However, because the axis of the tool is fixed in the horizontal plane, work may only be performed on limited surfaces of the workpiece.

In order to increase the productivity of horizontal milling machines, those in the art have developed what is commonly referred to as a right angle head as an attachment to the horizontal boring machine. A right angle head is attached to the housing and is powered by the horizontal shaft of the apparatus. As its name would suggest, the right angle head serves to allow the rotary motion to be imparted along an axis which is perpendicular to that of the horizontal shaft. A tool receiving spindle similar to that provided on the horizontal boring machine is provided on the right angle head. Accordingly, by the use of the right angle head, machining such as milling, boring or facing operations may be performed along the horizontal axis which is perpendicular to that of the horizontal shaft and the overall utility of a horizontal boring machine may be markedly increased.

However, the prior art methods of attaching and readying the right angle head for use have been exceedingly inefficient. According to the prior art methods, the right angle head is prepared for attachment to the horizontal boring machine by first lifting the right angle head with a crane which must be provided by the machine shop itself. After lifting the right angle head in proximity to the housing, the operator must carefully align the bolts provided on the right angle head with the corresponding bolt holes on the housing. Because the right angle milling head weighs several hundred pounds, the alignment of these holes is very difficult at best and, at worst, damaging to the right angle head and the housing. Once the holes are aligned, the right angle head must be bolted to the housing and the bolts, if they are not lost, must be tightened to the appropriate torque. Now the arduous task of aligning the right angle head to the requisite tolerances of less than one-thousandth of an inch must transpire. The right angle head is mounted on an extended coupling to displace it from the housing. An alignment plate is then attached to the right angle head and then the bolts which attach the right angle head to the coupling must be carefully adjusted while continuously citing off the alignment plate until the requisite alignment is achieved. Finally, the alignment plate must be removed and the tool inserted into the spindle on the right angle head.

As is apparent from the foregoing, the attachment and alignment of the right angle head, according to prior art practices, often requires in excess of three hours' time. It will be readily appreciated that the loss of utilization of the horizontal boring machine, whose capital cost may exceed $1,000,000, coupled with the loss of operator time to effect the attachment of the right angle milling head, yield significant losses of productivity and expense. In accordance with the present invention, however, apparatus is provided for automatically attaching the right angle head with improved accuracy and in a time of less than five minutes. As such, the shortcomings with the prior art methods for attaching a right angle milling head to a horizontal boring machine are overcome.

SUMMARY OF THE INVENTION

In accordance with present invention, there is provided a method and apparatus for automatically attaching an attachment for a machine tool to the machine tool itself. In particular, there is provided an apparatus for automatically attaching a right angle head to a horizontal boring machine.

The present invention includes a first collar which is affixed to the housing for the horizontal output shaft of the milling machine. Attachment receiving members are provided within the collar.

In addition, a second collar is provided on the right angle attachment which is intended for mating with the first collar. Positive attachment means, such as ball locking apparatuses, are provided in the second collar. Further, means for generating a linear force along the axis of the ball locking means are provided. Preferably, such means for generating the longitudinal output include a hydraulic cylinder. Accordingly, the second collar includes a plurality of ball locking means and their associated actuators as well as lines for permitting the passage of hydraulic fluid therethrough. Also, means for coupling the hydraulic fluid passageways to the housing for the horizontal axis are provided. Secured to the second collar is a shroud which rigidly supports the right angle head.

In order to facilitate the automatic mounting of the right angle head in accordance with the present invention, a cradle is attached to the movable table of the horizontal boring machine. The cradle serves to support the right angle attachment in a known location relative to the horizontal axis of the housing. In addition, retention means are provided in the cradle in order to permit the right angle head to be retained in either of two operative positions which are 180° apart. Further, means are provided on the right angle head for positively retaining it in either of such rest positions.

In accordance with the preferred embodiment of the invention, a housing is provided above the cradle to shield the right angle attachment. Preferably, the housing is pivoted between an opened and a closed position and includes a counterweight and hydraulic cylinder for facilitating the movement of the cover.

In accordance with the operation of the present invention, when the right angle head is to be utilized, the horizontal boring machine may enter a program according to which the housing is simultaneously opened while the cradle supporting the right angle head is moved into a position in proximity with the first collar. The right angle head, while supported in the cradle, is then urged into an operating position by a relatively slower movement of the carriage relative to the housing. Such movement results in the engagement of a hydraulic coupling between a source of hydraulic fluid and the hydraulic port which communicates with the hydraulic cylinders. The hydraulic fluid may then be automatically or manually actuated in order to create hydraulic pressure extending the cylinders and thereby moving the locking member of the ball locks to cause engagement of the ball lock with the ball lock receiving means. Simultaneously with this action, the spindle which extends from the machine tool is caused to engage a driven receptacle within the right angle head. This procedure provides a positive interconnection between the output of the horizontal shaft and the input to the right angle head.

Accordingly, the instant right angle head installation procedure may be accomplished within a time period of between two and five minutes. Clearly, when faced with the alternative of a procedure involving in excess of three hours of labor intensive installation and alignment of the right angle head and the concomitant downtime of the expensive horizontal boring machine, the instant apparatus achieves unexpectedly superior performance characteristics. In addition, the possible errors of misalignment and the destruction of subsequent machine parts are avoided. These and other objects of the present invention will become apparent as the following detailed description of the preferred embodiment proceeds.

BRIEF DESCRIPTION OF THE DRAWINGS

For the present invention to be clearly understood and readily practiced, preferred embodiments will now be described, by way of example only, with reference to the accompanying Figures wherein like members bear like reference numerals and wherein.

DETAILED DESCRIPTION OF THE PREFERRED EMBODIMENT

Figure 1:
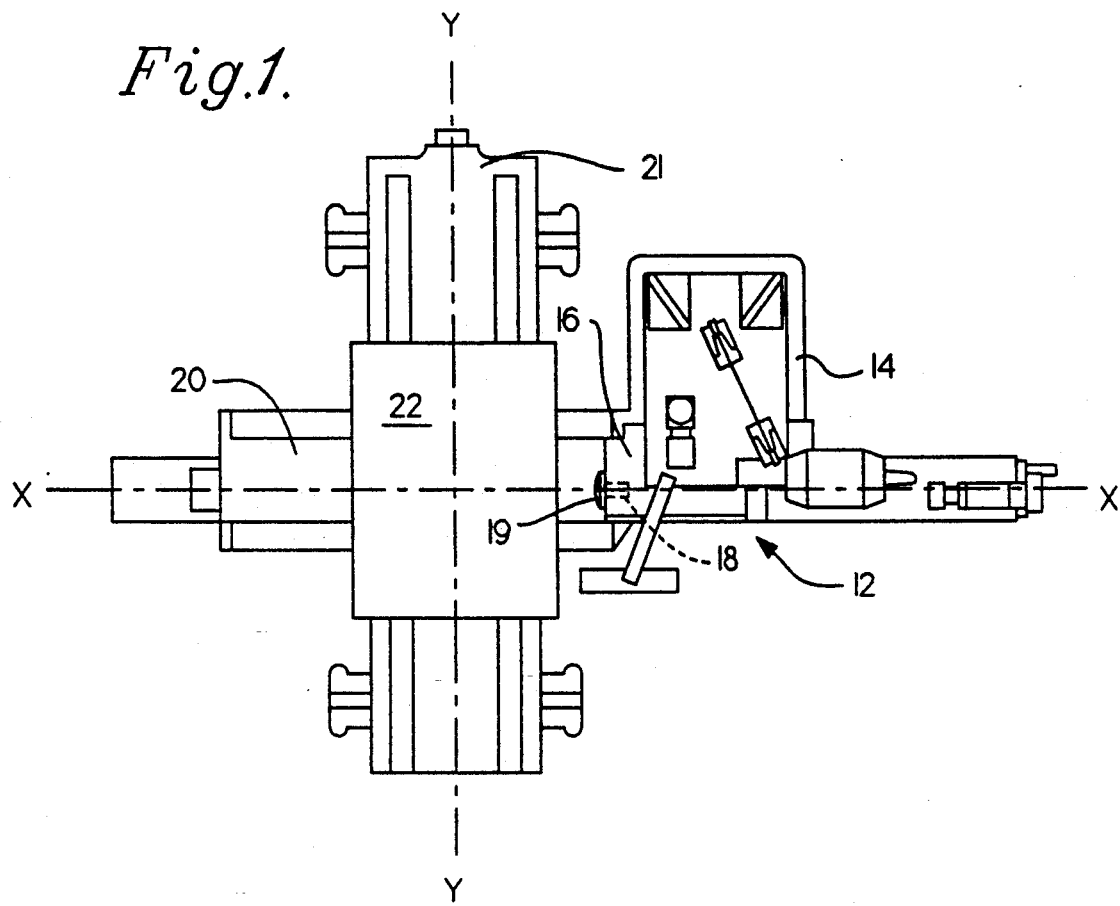
FIG. 1 is a top view of a typical horizontal boring machine.

Referring now to the drawings which are for purposes of illustrating the preferred embodiment of the present invention only and not for purposes of limiting the same, the Figures show a mounting apparatus generally designated as 10 for mounting a right angle milling head 24 to a horizontal boring machine 12.

Figure 2:
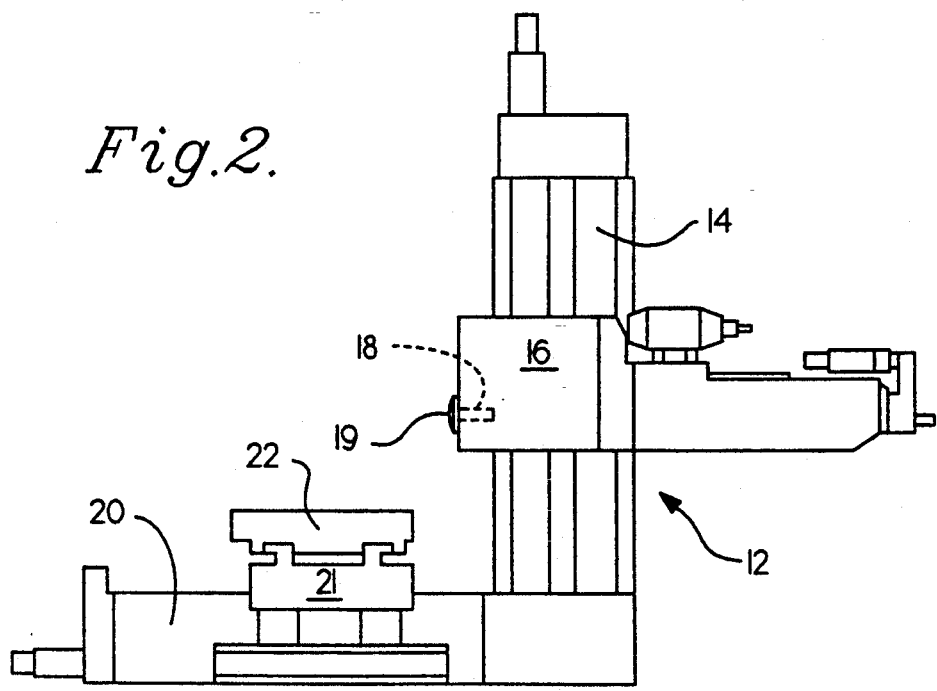
FIG. 2 is a side elevation view of the horizontal boring machine of FIG. 1.

More particularly, and with reference to FIGS. 1 and 2, the horizontal boring machine 12, is exemplary of typical horizontal boring machines, the construction and operation of which are well known in the art. As such, a detailed description of the operation of the horizontal boring machine 12 need not be set forth herein beyond that which is necessary to understand the present invention. It will therefore be understood that the horizontal boring machine 12 includes an upstanding vertical mast portion 14 having a vertically displaceable housing 16 slidably attached thereto. The housing 16 supports and houses a rotatable horizontal shaft 18 having a spindle 19 on which either milling or drilling tools (not shown) may be received.

The horizontal boring machine 12 further includes a horizontal bed member 20 arranged in close proximity to the vertical mast 14 with a workholding table 22 slidably disposed thereon. More specifically, as most clearly shown in FIGS. 1 and 2, the workholding table 22 is mounted to a carriage member 21 that is adapted to be slidably located on the bed 20 along a horizontal axis generally designated in the Figures as "X". Conversely, the table 22 is slidably attached to the carriage member 21 such that it may be displaced thereon along a horizontal axis generally designated in the Figures as "Y". It will be appreciated that a variety of motor and shaft arrangements (not shown) in conjunction with microprocessors and other process control devices (not shown) are typically used to automatically and precisely locate the workholding table 22 along the horizontal "X" and "Y" axes with respect to the housing 16, to control the vertical movement of housing 16 and to control the speed and feed rates of the shaft 18. It will be further appreciated that various work holding devices, such as fixtures and jigs (not shown), may be attached to the table 22 for rigidly holding the part to be machined in predetermined positions relative to the housing 16.

Figure 3:
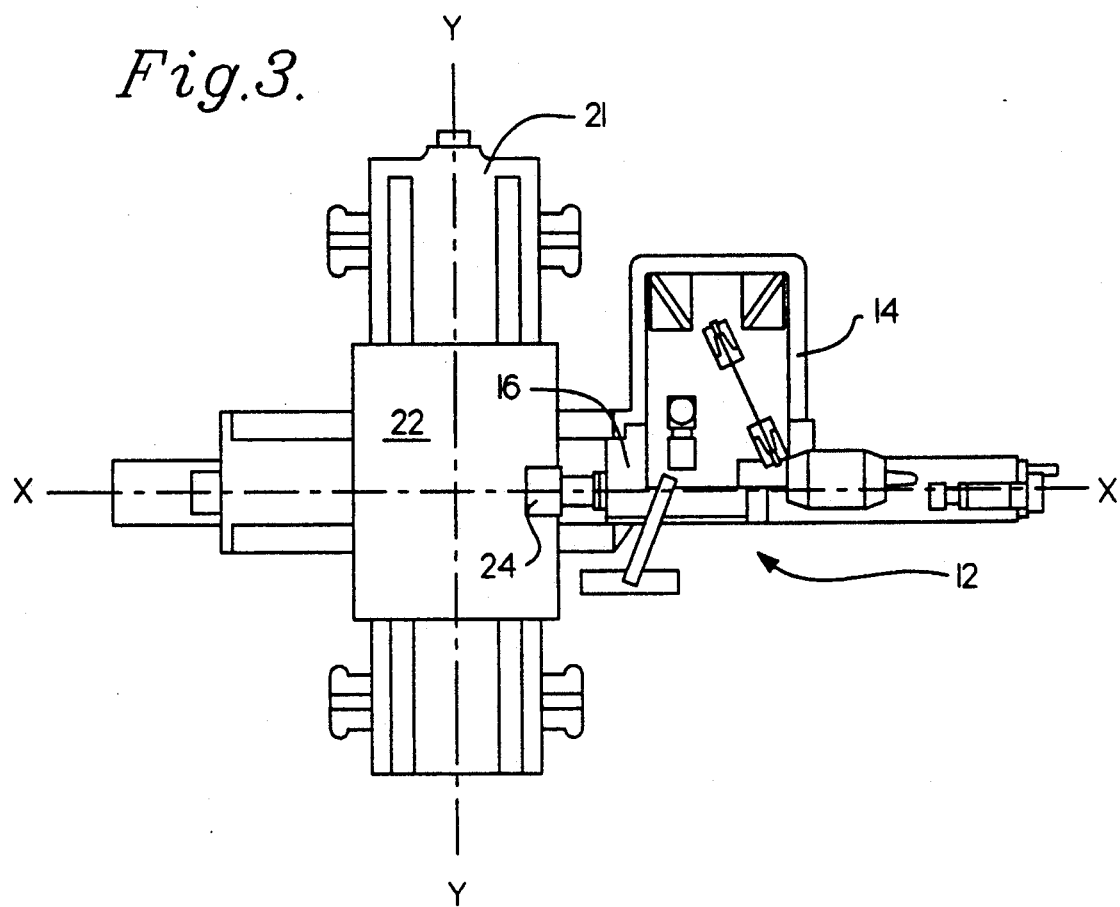
FIG. 3 is a top view of a typical horizontal boring machine with a right angle milling head attached thereto.
Figure 4:
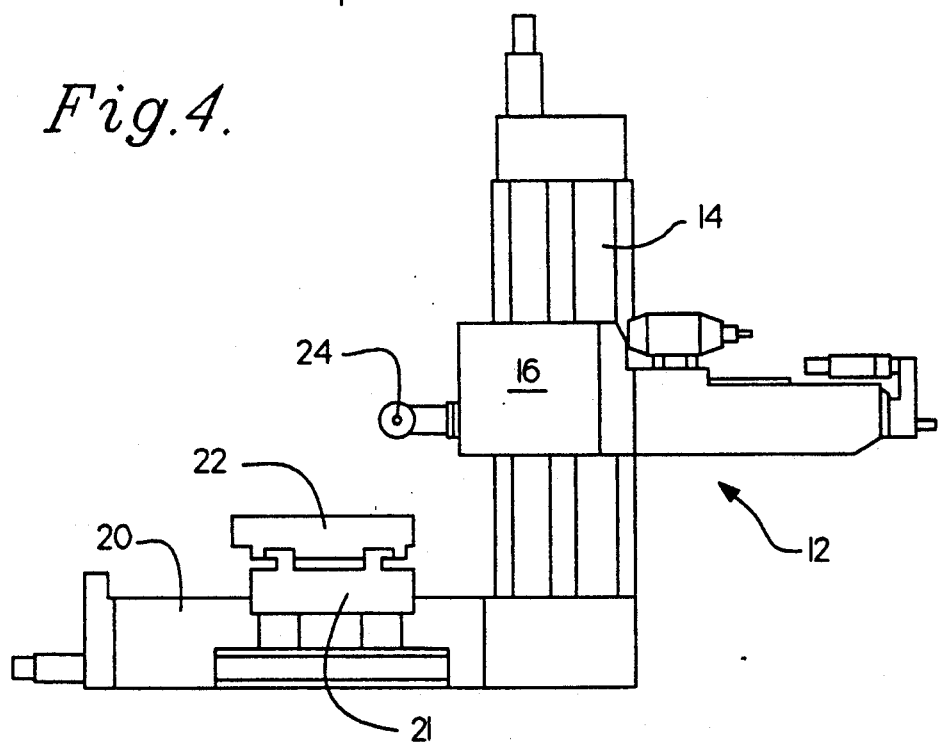
FIG. 4 is a side elevational view of the horizontal boring machine and right angle milling head of FIG. 3.

As indicated above, in order to increase the productivity of horizontal boring machines, various right angle attachments have been developed. As can be seen in FIG. 3, a typical right angle head, generally designated as 24, is attached to the housing 16 and is powered by the horizontal shaft 18 (See FIGS. 1 and 2). The present invention comprises a method and apparatus for automatically attaching the right angle head 24 to the housing 16 without the need for cumbersome cranes and attachment devices.

Figure 5:
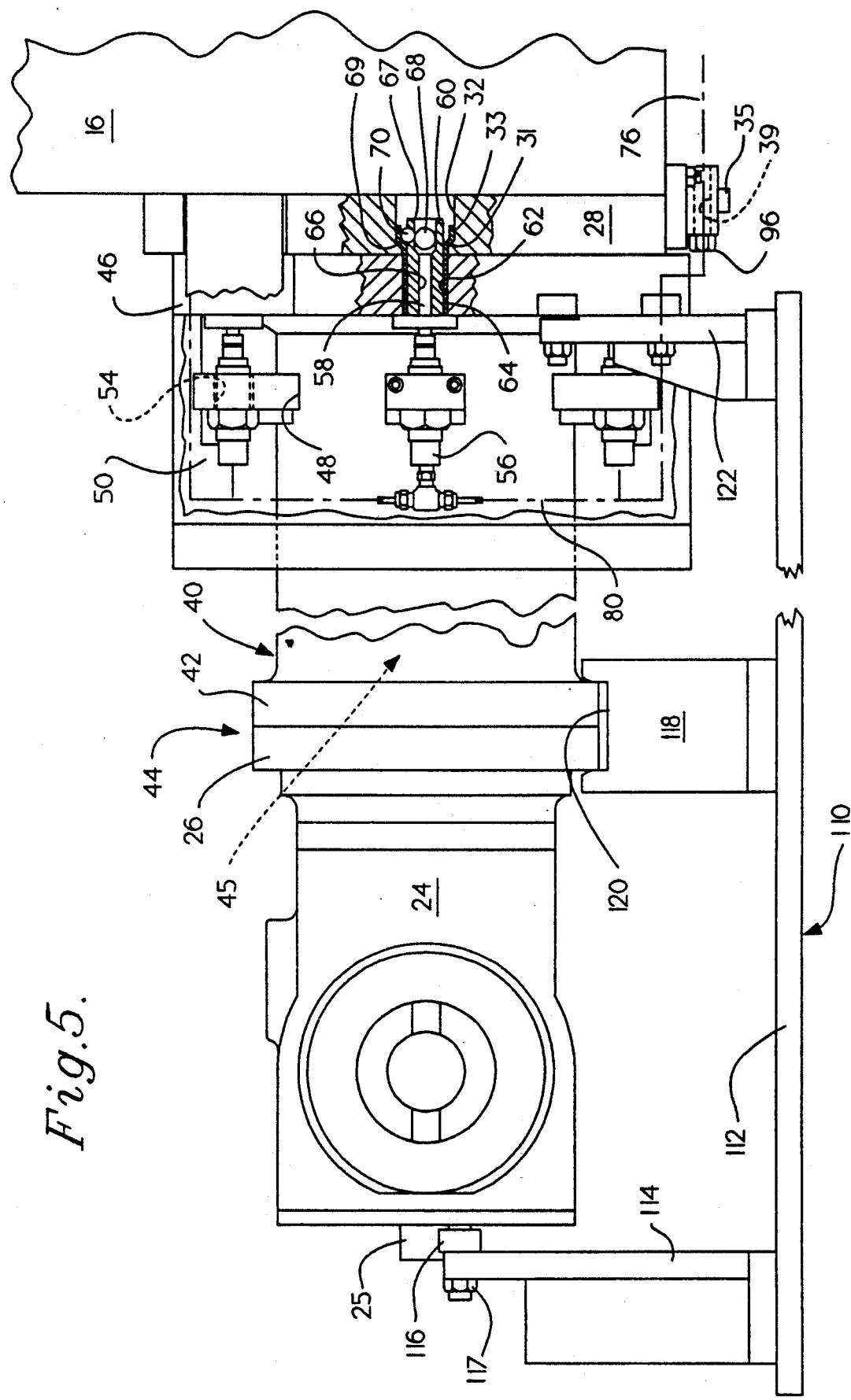
FIG. 5 is a side elevational view of the coupling apparatus of the present invention.

As shown in FIG. 5, the present invention includes a hollow coupling member generally designated as 40 that is adapted to operably affix the right angle head 24 to the housing member 16. More specifically, one end of the coupling member 40 is removably fastened to the right angle head 24 by a flange member 42. The flange member 42 is preferably welded to the end of the coupling member 40 in confronting relationship to a mounting flange 26 located on the right angle head 24. It will be appreciated by those of ordinary skill in the art that the flange member 42 is connected to the mounting flange 26 on the right angle head 24 by a plurality of mounting bolts (not shown) to create a right angle head/coupling member assembly, generally designated as 44. The hollow coupling member 40 is adapted to receive and align the shaft member 18 with a drive coupling, shown schematically as 45, for the right angle head 24 (discussed below). To attach the coupling member 40 to the housing 16 so that the shaft member 18 is held in alignment with the drive coupling 45 for the right angle head 24, an attachment flange 46 is rigidly affixed to the end of the coupling member 40 that is opposite the right angle head 24. As most particularly shown in FIG. 5, the attachment flange 46 has a plurality of members, generally designated as 50, rigidly attached thereto that are adapted to precisely align and connect the attachment flange 46 to bores in a corresponding mating flange 28 mounted to the housing 16.

More specifically, in the preferred embodiment, six cylinder actuated attachment members 50 are preferably received in corresponding threaded bores 48 located in the perimeter of the coupling member 40 and are retained therein by threads on the outside of the cylinder. However, those of ordinary skill in the art will recognize that the cylinder actuated attachment members 50 may be readily attached to the perimeter of the coupling member 40 by other suitable fastening means.

I have found the ball lock mounting systems manufactured by Jergins Industrial Supply under the trademark BALL LOCK TM to be well suited for fastening the attachment flange 46 to the mating flange 28. As can be seen in FIG. 5, the preferred attachment members 50 consist of a ball lock shank 60 that is adapted to extend through a corresponding bore 62 located in the attachment flange 46. In the preferred embodiment, each ball lock shank 60 is slidably received in a corresponding liner bushing 64 that is pressed into each bore 62. It will be appreciated by those of ordinary skill in the art that each ball lock shank 60 has an axial bore 66 that extends through the entire length of the shank 60. A second coaxial counterbore 67 is provided in the end of the shank portion 60 and is adapted to loosely receive a plunger ball 68 therein. As can further be seen in FIG. 5, a third bore 69 extends through the side of the shank 60 to communicate with the counterbore 67. A plurality of smaller engagement balls 70 is movably received in the third bore 69 such that a portion of the engagement balls 70 extend therein to engage the plunger ball 68.

I have discovered that, instead of the screw means generally provided, a hydraulically powered actuator cylinder 56 is preferably provided to generate a longitudinal force against the plunger ball 68 to cause the plunger ball 68 to move into engagement with the engagement balls 70 thus causing the engagement balls 70 to move radially outward to center the ball lock shank 60 in the receiver bushing 33 (described below). More specifically, the rod portion 58 of each cylinder 56 is slidably received in the corresponding axial bore 66 located in a corresponding shank portion 60.

Figure 6:
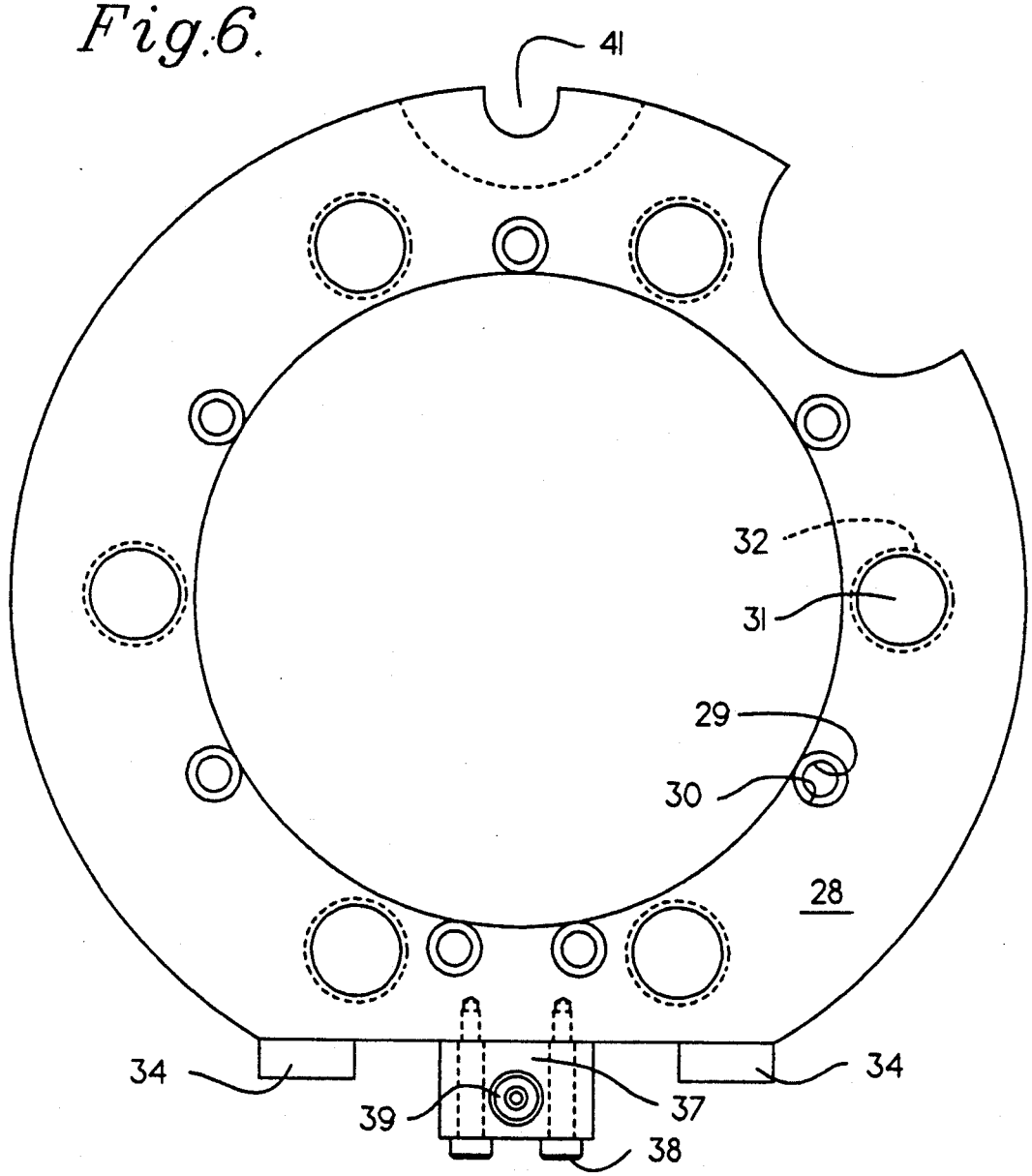
FIG. 6 is a front elevational view of the mating flange of the present invention.

Referring now to FIGS. 5 and 6, the mating flange 28 is attached to the housing 16 via a plurality of cap screws (not shown). More specifically, the mating flange 28 has a plurality of equally spaced bores 29 therethrough that are adapted to receive corresponding cap screws (not shown) to secure the mating flange 28 to the housing 16. As can be seen in FIG. 6, each bore 29 has a counterbore 30 that is adapted to fully receive the head of a corresponding capscrew therein.

Figure 7:
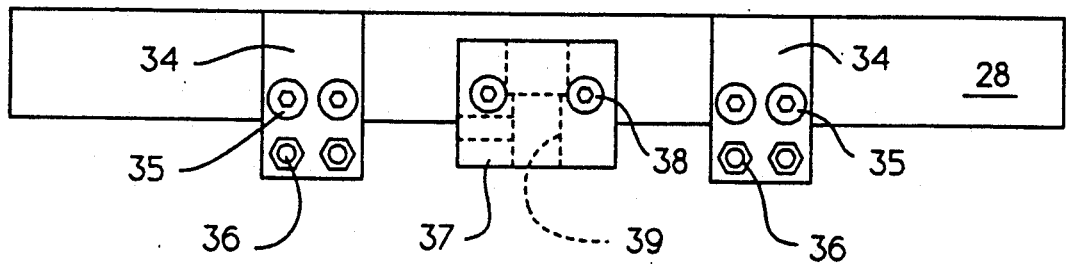
FIG. 7 is a bottom view of the mating flange of FIG. 6.
Figure 8:
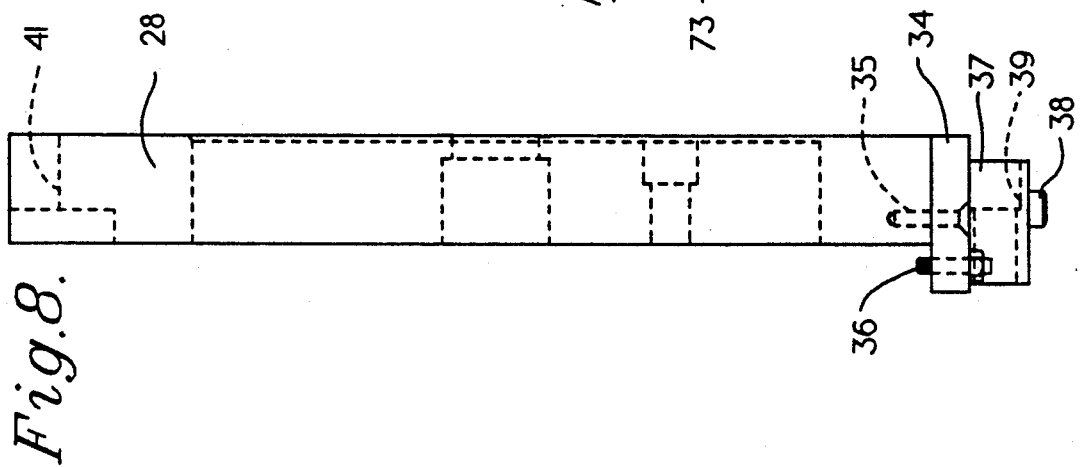
FIG. 8 is a left side view of the mating flange of FIGS. 6 and 7.

In addition, the mating flange 28 has a plurality of corresponding bores 31 therethrough that substantially correspond with the shank portions 60 of the cylinder actuated attachment members 50. In the preferred embodiment, the bores 31 each have a counterbored portion 32 that is adapted to receive a flanged receiver bushing 33 therein (See FIGS. 5 and 6). Preferably, the receiver bushing 33 and the corresponding bores 31 and 32 are toleranced such that the receiver bushing 33 may be pressed and retained therein without any additional mechanical fastening means. Also, as shown in FIGS. 6, 7 and 8, two attachment pads 34 are preferably fastened to the bottom portion of the mating flange 28 by capscrews 35. The attachment pads 34 are also removably fastened to the bottom of the housing 16 by at least two capscrews 36 that are threadedly received in corresponding threaded bores (not shown) in the bottom of the housing 16.

Figure 9:
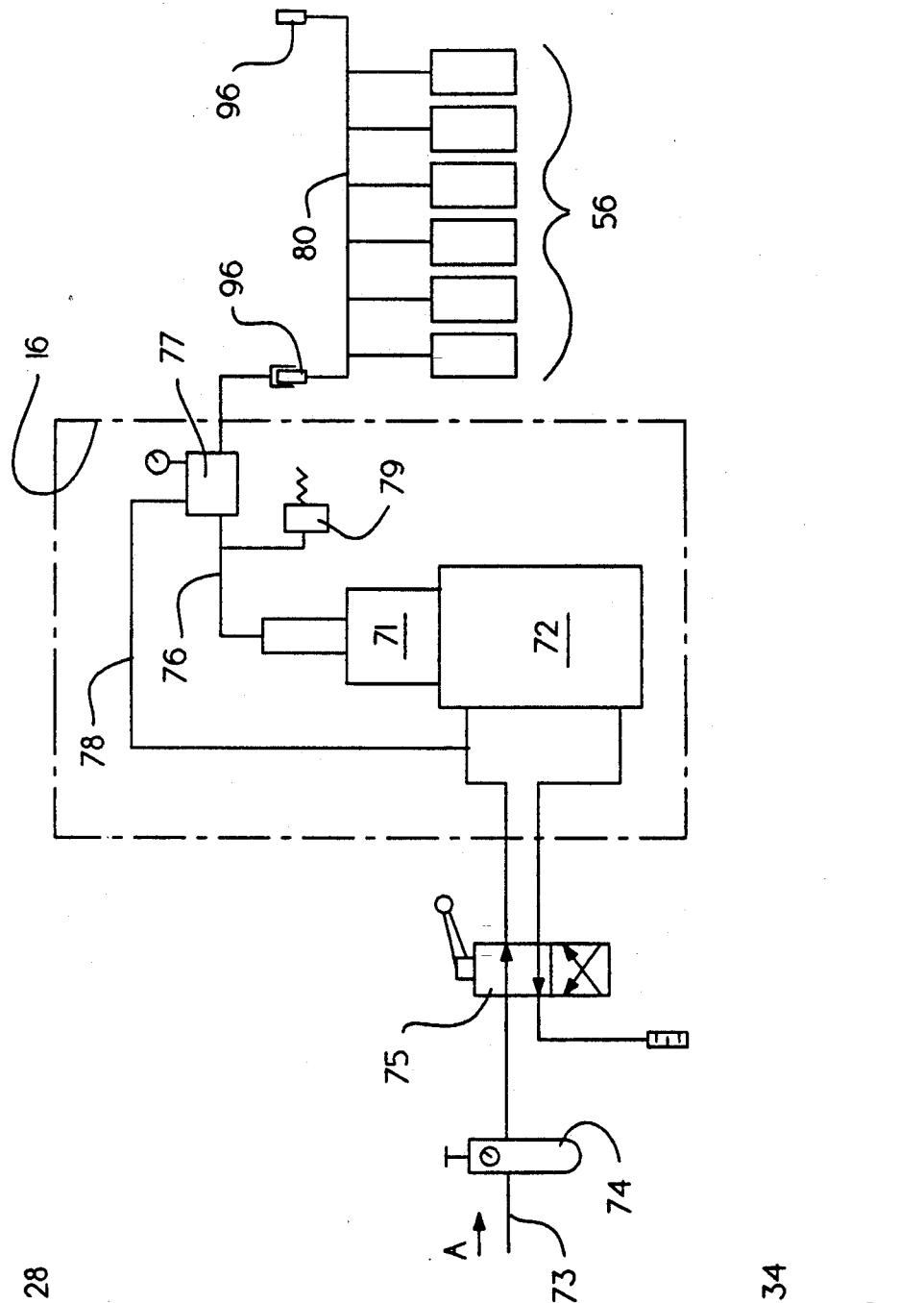
FIG. 9 is a schematic view of the hydraulic system of the present invention.

Hydraulic fluid to power the hydraulically powered cylinders 56 is supplied from a hydraulic fluid reservoir 71 located in the housing 16 as shown in FIG. 9. FIG. 9 is a schematic diagram of the air powered hydraulic system used to actuated the cylinder members 56. More specifically, a source of compressed air is connected to an air receiving booster chamber 72 located in the housing member 16 through an air supply line 73. It will be understood that the booster chamber 72 communicates with the fluid reservoir 71 such that when compressed air is permitted to enter the booster chamber 72, the hydraulic fluid located in the hydraulic fluid reservoir 71 is caused to flow therefrom to the cylinders 56 through hydraulic lines 76 and 80.

In the preferred embodiment, prior to entering the booster chamber 72, the air is filtered through a conventional compressed air filter 74. Thereafter, the air encounters a conventional control valve 75 adapted to control the flow of air through the system. To actuate the cylinders 56, the control valve 75 is manipulated to permit the air to flow into the booster chamber 72 which causes the fluid to flow from the fluid reservoir 71 to the cylinders 56 via the hydraulic line 76. In the preferred embodiment, the control valve 75 is manually operated, however, those of ordinary skill in the art will recognize that other various types of control valves may be used, including ones controlled by the controller for the horizontal boring machine 12. In addition, I prefer to use a conventional air piloted check valve 77 to control the back flow of hydraulic fluid through the hydraulic line 76. More specifically, air is supplied to the check valve 77 through an air line 78 that is connected to the air supply line 73 between the control valve 75 and the booster chamber 72. The check valve 77 will permit the hydraulic fluid to freely flow from the reservoir 71 to the cylinders 56 and back as long as air is supplied to the check valve 77. However, should the air pressure be suddenly interrupted or stopped, the check valve 77 will prevent the hydraulic fluid from flowing from the cylinders 56 back to the reservoir 71. I have found the above described arrangement to be invaluable in instances wherein the source of compressed air has been disabled by a power outage caused, perhaps, by an electrical storm. As such, when the source of compressed air is unexpectedly disabled, the cylinders 56 remain extended to thereby cause the coupling member 40 to remain attached to the housing 16. Also in the preferred embodiment, a pressure switch 79 may be incorporated into the hydraulic line 76 to detect a sudden drop in hydraulic pressure. It will be appreciated that the pressure switch may be attached to an alarm device such as a flashing light (not shown) to signal such loss of hydraulic pressure.

Figure 10:
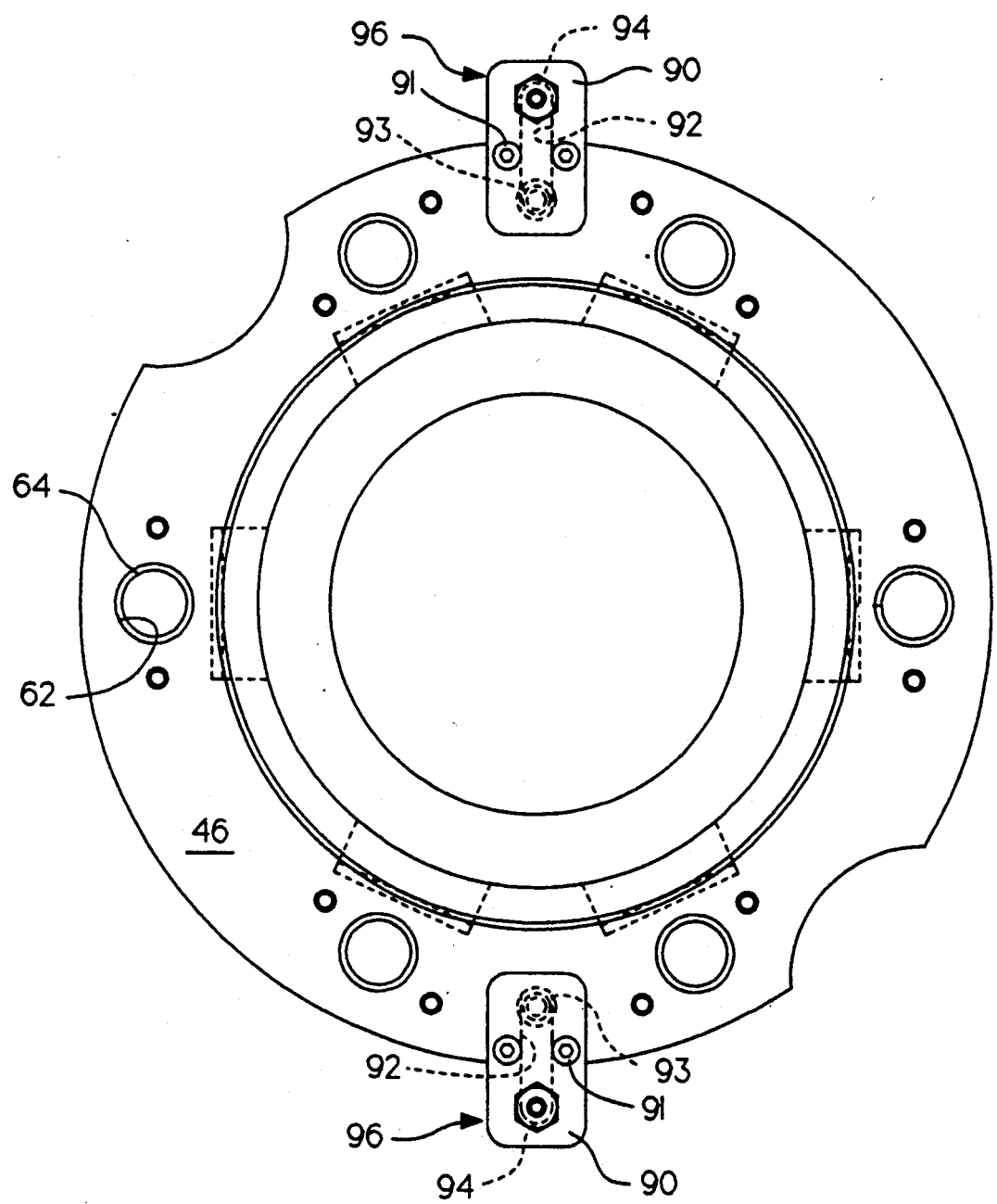
FIG. 10 is a front view of the attachment flange of the coupling member of the present invention.
Figure 11:
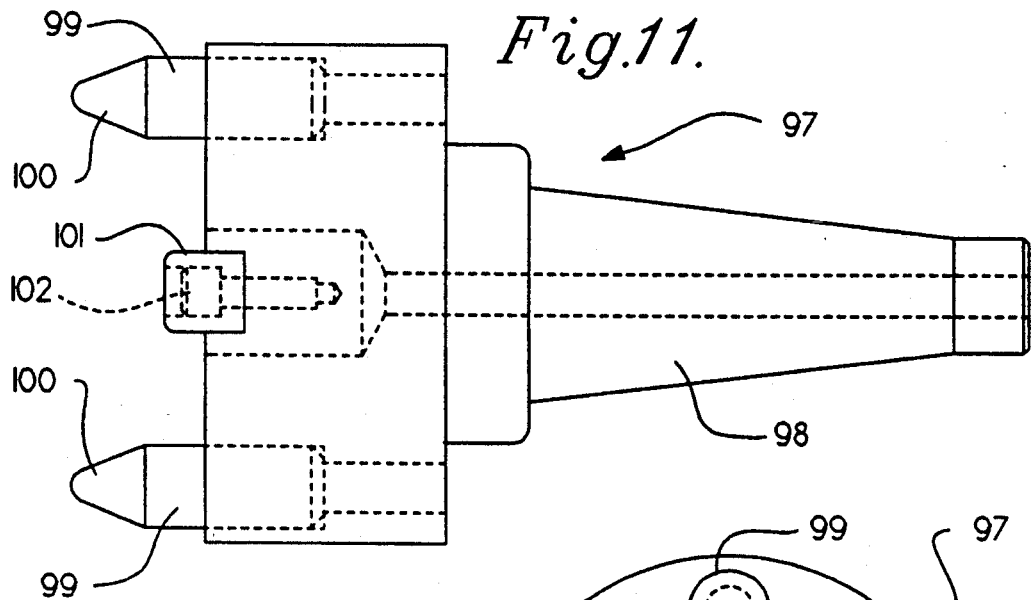
FIG. 11 is a side elevation view of the drive member of the present invention.
Figure 12:
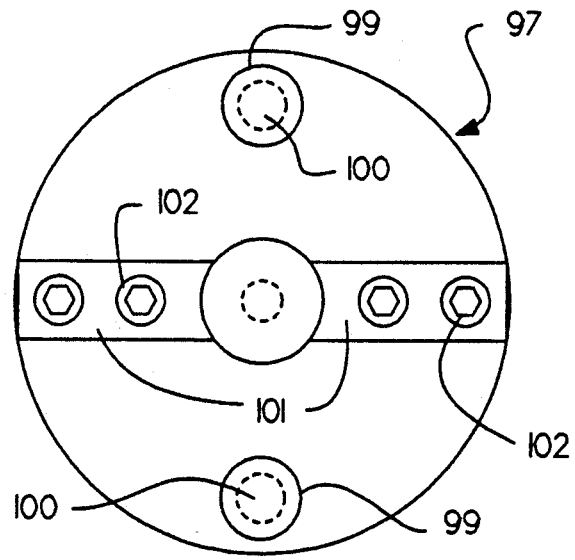
FIG. 12 is an end elevation view of the drive member.
Figure 13:
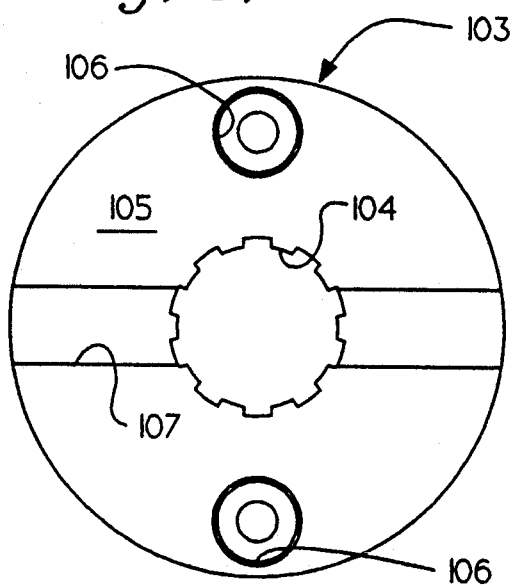
FIG. 13 is an end elevation view of the driven element of the present invention.
Figure 14:
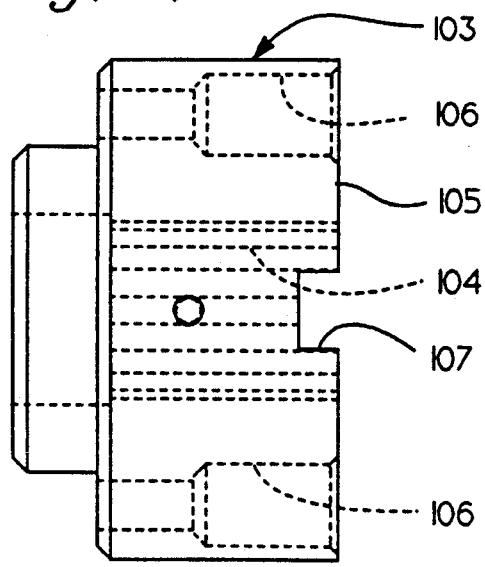
FIG. 14 is a side elevation view of the driven element.

The hydraulic cylinders 56 are supplied with hydraulic fluid through a self closing quick disconnect member 96 that communicates with the hydraulic line 76. As can be seen in FIGS. 5 and 10, two outwardly projecting tab members 90 are affixed 180 degrees apart to the attachment flange 46. Preferably, the tab members 90 are affixed to the attachment flange 46 by capscrews 91 that are threadedly received in corresponding threaded bores (not shown) provided in the attachment flange 46. As can be seen in FIG. 10, each tab member 90 has a fluid passage 92 extending longitudinally therethrough. Communicating with the each fluid passage 92 are threaded bores 93 and 94. In particular, the threaded bore 94 is adapted to threadedly receive a self-closing quick disconnect member 96. I prefer to use the general disconnect couplings manufactured by Parker. However, those of ordinary skill in the are will appreciate that other types of conventional self closing quick disconnect members may be used. The threaded bores 93 communicate with corresponding threaded bores (not shown) that are provided through the attachment flange 46 and are adapted to threadedly receive therein conventional hydraulic fittings (not shown) for connecting the fluid passages 92 to the hydraulic line 80 supplying the cylinders 56.

As can be seen in FIGS. 6, 7, and 8, a receiving block 37 is attached to the bottom of the mating flange 28 by capscrews 38. The receiving block 37 has a port 39 therethrough that is connected to the hydraulic line 76 by conventional hydraulic fittings (not shown). In addition, the port 39 is adapted to snugly receive a quick disconnect 96 therein as shown in FIG. 5. It will be appreciated that by virtue of engagement with the port 39, the self-closing quick disconnect 96 will be caused to open to permit the free flow of hydraulic fluid therethrough. Conversely, when the quick disconnect is removed from the port 39, it will automatically close.

It will be appreciated by those of ordinary skill in the art that, depending upon the orientation of the part to be machined, it may be necessary to adjust the operable position of the right angle milling head 24 from a first position to a second position which is 180 degrees apart from the first position. As such, the above described tab member arrangement enables the entire right angle milling head/coupling member assembly 44 to be rotated to one of the two operable positions so that when the attachment flange 46 engages the mating flange 28, one of the quick disconnect members 96 will be received in the port 39 while the other quick disconnect member 96 will be received in a groove 41 in the mating flange 28 located 180 degrees apart from the receiving block 37. It will be further understood, however, that the above-described tab member arrangement may be easily modified to enable the right angle milling head/coupling member assembly 44 to be rotatably located and retained in virtually any operable position desired.

As indicated above, in order to allow for the automatic coupling of the right angle head 24 to the horizontal shaft 18, there is provided a drive coupling 45. Drive coupling 45 includes a drive member 97 which has a tapered end 98 which is slidably received in and coupled to the spindle 19. Guide pins 99 having tapered ends are provided on the other end of the drive member 97 as is a transverse drive bar 101 which is secured thereto by cap screws 102. Operatively coupled to the splined drive shaft (not shown) included in the right angle head 24 is a driven element 103 which has a correspondingly splined bore 104. Driven element 103 includes a face 105 having bores 106 therein for receiving the guide pins 99 and a keyway 107 for receiving the drive bar 101. As such, when the right angle head 24 carrying the driven element 103 is moved into proximity with the spindle 19 supporting the drive member 97, the guide pins 99 are guided into the bores 106 by virtue of the tapers 100 on the ends of the guide pins 99 cooperating with small tapers on the ends of the bores 106. As the driven element 103 is advanced, the guide pins 99 become self-centered and guide the drive bar 101 to fully engage the keyway 107.

Figure 15:
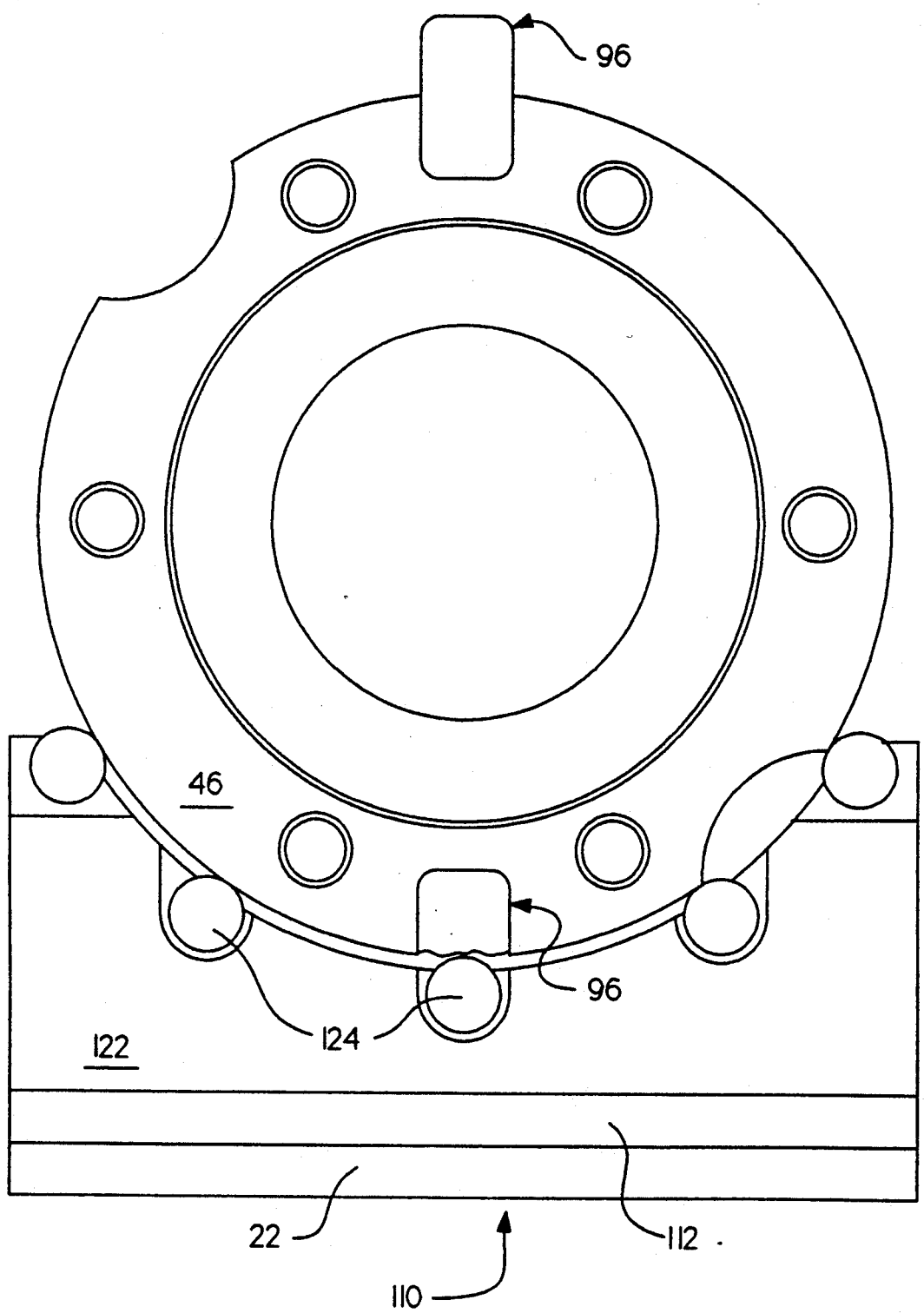
FIG. 15 is a right elevational view of the cradle member of the present invention.

The present invention also includes a cradle member 110 that is adapted to support the right angle head/coupling member assembly 44 when it is not in use. The cradle member 110, as shown in FIGS. 5 and 15, preferably consists of a base member 112 and three upstanding support members 114, 118 and 122 that are adapted to receive the right angle milling head 24 and the coupling member 40 therein. The cradle member 110 is removably attached to the workholding table 22 in a known location relative to the horizontal axis of housing 16 by bolts (not shown).

Figure 16:
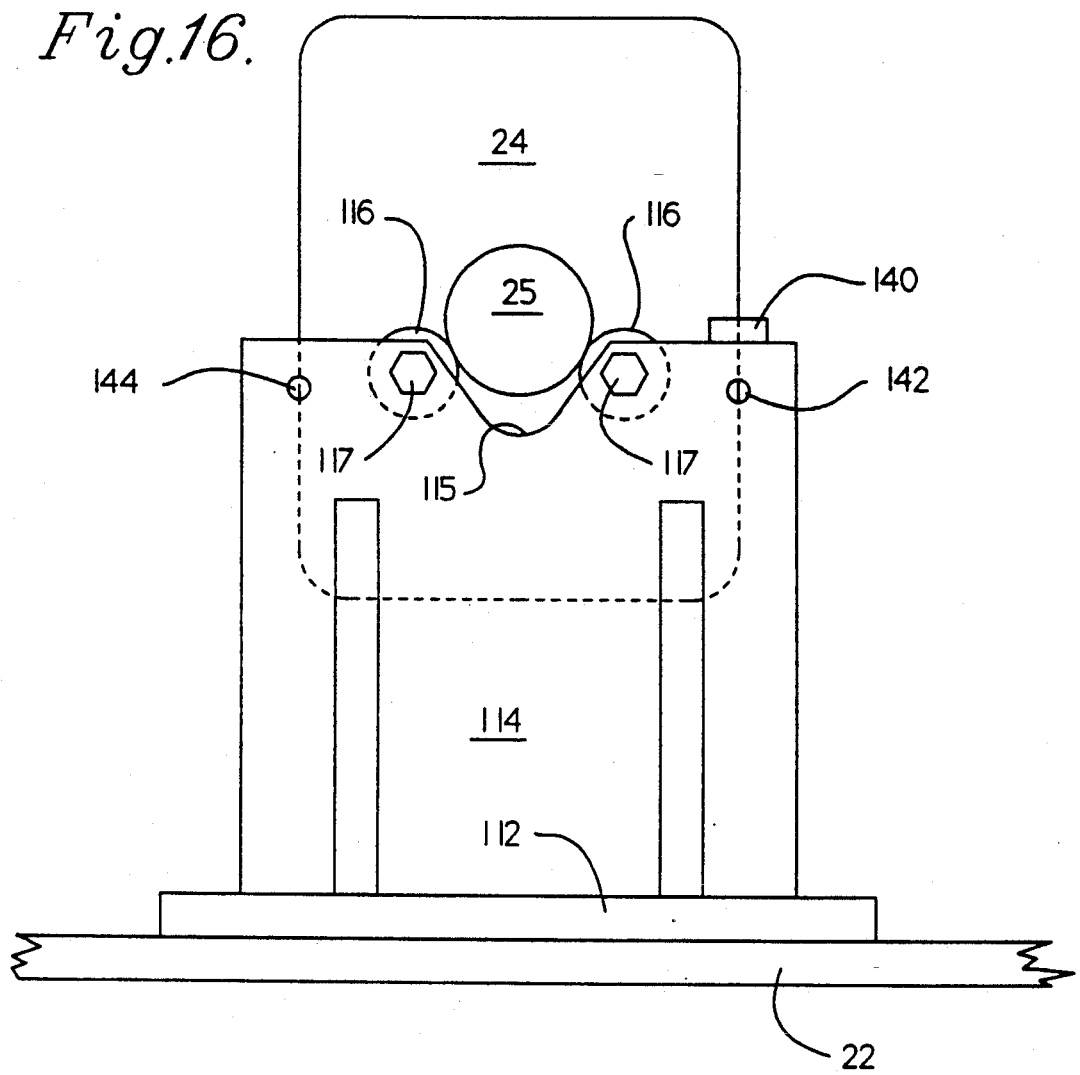
FIG. 16 is a left elevational view of the cradle member of the present invention.

As can be seen in FIGS. 5 and 16, the support member or cradle 114 is adapted to support a shaft member 25 that protrudes from the end of the right angle milling head 24. The support member 114 preferably has two bearing support members 116 attached thereto that are adapted to rotatably support the shaft member 25 therein. The bearing support members 116 are attached to the upstanding support 114 via bolts 117 and are exemplary of bearings known in the art. Also, as most particularly shown in FIG. 16, a "V" shaped clearance groove 115 is preferably provided in the upstanding support member 114 to furnish the shaft member 25 with the requisite clearance to enable it to be freely rotated on the bearing support members 116. In addition, a block 140 is attached to the end of the right angle head 24 and has a hole therein which may be engaged by either of two (2) detents 142 or 144, respectively, which are mounted in member 114 180° apart to retain the right angle head 24. As was noted above, however, the block 140 and detents 142 and 144 may be arranged to retain the right angle head 24 in various other angular orientations.

A second upstanding support member 118 is attached to the base member 112 and is adapted to support the flanged joint between the right angle head 24 and the coupling member 40. As most particularly shown in FIG. 5, the second upstanding support member 118, has a cradle portion 120 therein adapted to freely receive the flange members 26 and 42 therein. It will be understood that the cradle portion 120 is sized so that the flanges 26 and 42 may be freely rotated therein while also serving to substantially restrict the longitudinal movement of the right angle milling head/coupling member assembly 44.

As shown in FIGS. 5 and 15, a third upstanding support member 122 is provided to support the end of the coupling member 40 that has the attachment flange 46 attached thereto. Preferably, the third upstanding support member 122 has a plurality, preferably five, of bearing support members 124 attached thereto in such a manner so as to rotatably support the attachment flange 46 therein. To enable the coupling member 40 to be freely rotated, the upper portion of the upstanding support member 122 is radiused to provide the coupling member 40 with adequate rotational clearance. As such, the cradle member 110 provides the right angle milling head/coupling member assembly 44 with adequate support while enabling the assembly 44 to be freely rotated thereupon.

Figure 17:
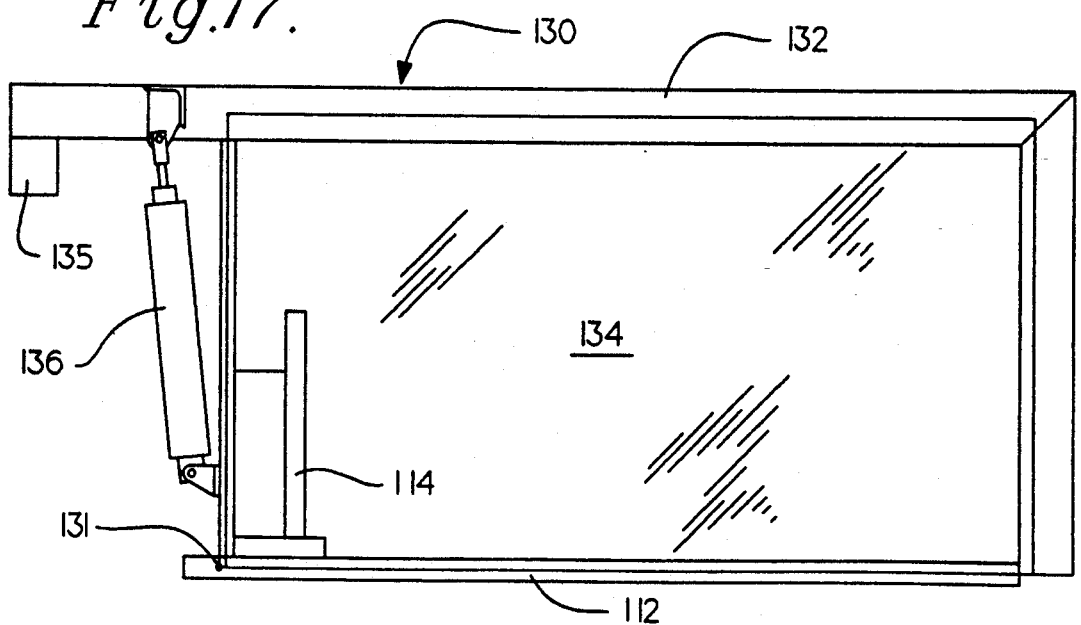
FIG. 17 is a side elevational of the protective enclosure of the present invention.

In the preferred embodiment, as can be seen in FIG. 17, a protective enclosure 130 adapted to shield the right angle head/coupling member assembly 44 is pivotally attached to the upstanding support member 114 to rotate about an axis 131. More specifically, the protective enclosure 130 consists of a frame member 132 with a plexiglass side member 134 attached thereto via screws (not shown). It will be appreciated by those of ordinary skill in the art that the other side members may be fabricated from other materials such as, for example, sheet metal. In addition, a counterweight 135 is provided to facilitate movement of the enclosure 130. Further, a hydraulic or pneumatic cylinder 136 is coupled between the enclosure and the support member 144 to provide to powered movement of the enclosure. Preferably, the actuation of the cylinder 136 may be controlled by the controller for the horizontal boring apparatus 12.

Preferably, the operation of the various aspects of the present invention are controlled by the central processing unit responsible for the overall control of the horizontal boring machine 12. When the control program is instructed to install the right angle head 24, the following functions take place. The carriage 21 is rather rapidly moved along the X and Y axes and the housing 16 is vertically displaced until the drive member 97 supported by spindle 19 and the driven element 103 in the right angle head 24 are in alignment. The hydraulic cylinder 136 is also simultaneously actuated to open the enclosure 130. The carriage 21 is then moved slowly along the X axis until the quick disconnect 96 couples with the port 39 and the guide pins 99 enter the bores 106 and cause the drive bar 101 to couple with the keyway 106. The valve 77 may then be manually, or preferably automatically, actuated to cause the locking of the locking members 50 by the cylinders 56 as described above. To reverse the process, the hydraulic fluid pressure is relieved via valve 77 and the carriage is returned to support the right angle head 24. Next, it is retracted first along the X then along the Y axes and the enclosure 130 is closed.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for operatively coupling a machine tool accessory having a rotational input means to a machine tool apparatus having a rotational output means, comprising:
   a. a first collar non-rotatably mounted on said machine tool apparatus adjacent to said rotational output, said first collar having a plurality of receptacle means therein and a first mating surface;
   b. a second collar mounted on said machine tool accessory and having a second mating surface for engaging said first mating surface;
   c. locking means mounted in said second collar for movement between a first position in non-threaded engagement with said receptacle means and a retracted position which is released from said receptacle means;
   d. means for moving said locking means between said first and second positions; and
   e. means for coupling said rotational output means to said rotational input means.

2. Apparatus of claim 1 wherein said locking means comprises a plurality of ball lock means, each comprising:
   a. a shank which may enter one of said receptacle means;
   b. laterally extendable locking balls which are moveable between one position in engagement with said receptacle means and another position in which said locking balls are retracted into said shank;
   c. a longitudinally moveable ball means for moving said locking balls from said another position to said one position; and
   d. means for longitudinally moving said moveable ball means.

3. Apparatus of claim 2 in which each said means for longitudinally moving said moveable ball means comprises a hydraulic cylinder and means for controlling the admission of hydraulic fluid under pressure to said hydraulic cylinder.

4. Apparatus of claim 3 in which said means for coupling said rotational output means to said rotational input means comprises:
   a. a drive member coupled to said rotational output means, said drive member including a surface facing toward said machine tool accessory and at least two guide pins and a transverse drive bar extending from said surface; and
   b. a driven element coupled to said rotational input means, said driven element including a surface facing said drive member and having therein bores for receiving said guide pins and a keyway for receiving said drive bar.

5. Apparatus of claim 4 in which said machine tool apparatus includes a workpiece holding table which is moveable relative to said rotational output means and said apparatus for operatively coupling further comprises cradle means attached to said table for supporting said machine tool accessory so that said cradle means is moveable between a primary position remote from said rotational output means and a secondary position in which said machine tool accessory is coupled to said machine tool.

6. Apparatus of claim 5 in which said cradle means comprises:
   a. base means;
   b. a first upstanding support member attached to said base means adjacent the end of said machine tool accessory closest to said rotational output and roller means attached to said first support member to support such end;
   c. a second upstanding support member attached to said base means adjacent the other end of said machine tool accessory and roller means attached to said second support member to support the other end; and
   d. means for positively retaining said machine tool accessory in a first operative position and in a second operative position on said cradle.

7. Apparatus of claim 6 further comprising enclosure means for enclosing and protecting said machine tool accessory when it is in said primary position.

8. Apparatus of claim 7 wherein said enclosure means comprises:
   a. a cover member pivotally attached to said cradle member and being adapted to cover said machine tool accessory therein; and
   b. means for pivoting said cover member between a position wherein said machine tool accessory is totally received within said enclosed member to a position wherein the machine tool accessory may be coupled to said machine tool apparatus.

9. Apparatus of claim 8 wherein said means for pivoting said cover member comprises a hydraulic cylinder controllably coupled to a source of hydraulic fluid.

10. A method for operatively coupling a machine tool accessory having a rotational input means to a machine tool apparatus having a rotational output means comprising the steps of:
   a. providing a non-rotatable first collar on said machine tool apparatus having a plurality of receptacle means therein and a first mating surface;
   b. providing a second collar on said machine tool accessory having a second mating surface for engaging said first mating surface;
   c. providing remotely actuatable locking means in said second collar between a first position in non-threaded engagement with said receptacle means and a retracted position which is released from said receptacle means;
   d. providing means for coupling said rotational output means to said rotational input means which is moveable between an engaged position and a disengaged position;
   e. orienting said machine tool accessory in a primary predetermined orientation with respect to said machine tool apparatus so that said rotational input means is aligned with but displaced from said rotational output means;
   f. moving said machine tool accessory into engagement with said machine tool apparatus to cause said means for coupling to assume said engaged condition, said second mating face to engage said first mating face and said locking means to assume said second position; and
   g. actuating said locking means to cause said locking means to assume said first position to lock said machine tool accessory to said machine tool apparatus.

11. The method of claim 10 wherein said machine tool apparatus includes a workpiece holding table which is moveable relative to said rotational output means and the step of orienting the machine tool accessory in a primary predetermined orientation includes the step of providing a cradle means attached to said table and having means for supporting and positively retaining said machine tool accessory in said primary predetermined orientation.

12. The method of claim 11 in which said cradle means includes means for supporting said machine tool accessory in a plurality of predetermined orientations and means for rotating said machine tool accessory between said orientations, further comprising the step of rotating said machine tool accessory into said primary orientation.

13. The method of claim 10 in which said means for coupling comprises a drive member coupled to said rotational output means, said drive member including a surface facing toward said machine tool accessory and at least two drive pins and a transverse drive bar extending from said surface and a driven element coupled to said rotational input means, said driven element including a surface facing said drive member and having therein bores for receiving said guide pins and a keyway for receiving said drive bar, in which said step of causing said means for coupling to assume said engaged condition comprises the steps of causing said guide pins to enter said bores and said drive member to enter said keyway.

* * * * *

UNITED STATES PATENT AND TRADEMARK OFFICE
CERTIFICATE OF CORRECTION

PATENT NO. : 5,242,358
DATED : September 7, 1993
INVENTOR(S) : Dennis Cowles

It is certified that error appears in the above-indentified patent and that said Letters Patent is hereby corrected as shown below:

Col. 2, line 20, after "with", insert --the--.

Col. 6, line 25, delete "actuated" and substitute therefor --actuate--.

Col. 7, line 17, delete "the".

Col. 7, line 22, delete "are" and substitute therefor --art--.

Col. 7, line 68, after "ends", insert --100--.

Col. 9, line 23, delete "to".

Signed and Sealed this

Twenty-fourth Day of May, 1994

BRUCE LEHMAN

*Attest:*

*Attesting Officer*   *Commissioner of Patents and Trademarks*